US010452401B2

(12) United States Patent
Kenney (10) Patent No.: US 10,452,401 B2
(45) Date of Patent: Oct. 22, 2019

(54) HINTS FOR SHARED STORE PIPELINE AND MULTI-RATE TARGETS

(71) Applicant: Apple Inc., Cupertino, CA (US)

(72) Inventor: Robert D. Kenney, Austin, TX (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 15/463,511

(22) Filed: Mar. 20, 2017

(65) Prior Publication Data

US 2018/0267804 A1 Sep. 20, 2018

(51) Int. Cl.
 *G06F 9/38* (2018.01)
 *G06F 9/30* (2018.01)

(52) U.S. Cl.
 CPC ........ *G06F 9/3836* (2013.01); *G06F 9/30043* (2013.01); *G06F 9/3867* (2013.01)

(58) Field of Classification Search
 None
 See application file for complete search history.

(56) References Cited

U.S. PATENT DOCUMENTS

| | | | | |
|---|---|---|---|---|
| 4,321,668 A * | 3/1982 | Flynn | ...................... | G06F 7/491 712/225 |
| 6,230,260 B1 * | 5/2001 | Luick | .................... | G06F 9/3804 712/239 |
| 6,963,940 B1 * | 11/2005 | Glassen | ................ | G06F 11/349 710/107 |
| 7,155,716 B2 * | 12/2006 | Hooman | ................ | G06F 9/4881 718/102 |
| 7,417,637 B1 * | 8/2008 | Donham | ................ | G09G 5/001 345/506 |
| 7,877,558 B2 | 1/2011 | Hughes et al. | | |
| 8,352,712 B2 | 1/2013 | Bell, Jr. et al. | | |
| 2005/0275663 A1 * | 12/2005 | Kokojima | ............... | G06T 15/30 345/622 |
| 2007/0204075 A1 * | 8/2007 | Rajan | ...................... | G06F 13/28 710/22 |
| 2009/0125854 A1 * | 5/2009 | Hakura | ............... | G06F 11/3447 716/106 |

(Continued)

*Primary Examiner* — Kee M Tung
*Assistant Examiner* — Patrick F Valdez
(74) *Attorney, Agent, or Firm* — Meyertons, Hood, Kivlin, Kowert & Goetzel, P.C.

(57) ABSTRACT

Techniques are disclosed relating to selecting store instructions for dispatch to a shared pipeline. In some embodiments, the shared pipeline processes instructions for different target clients with different data rate capabilities. Therefore, in some embodiments, the pipeline is configured to generate state information that is based on a determined amount of work in the pipeline that targets at least one slower target. In some embodiments, the state information indicates whether the amount of work is above a threshold for the particular target. In some embodiments, scheduling circuitry is configured to select instructions for dispatch to the pipeline based on the state information. For example, the scheduling circuitry may refrain from selecting instructions with a slower target when the slower target is above its threshold amount of work in the pipeline. In some embodiments, the shared pipeline is a store pipeline configured to execute store instructions that target memories with different data rate capabilities.

20 Claims, 8 Drawing Sheets

(56) References Cited

U.S. PATENT DOCUMENTS

| | | | |
|---|---|---|---|
| 2011/0035751 A1* | 2/2011 | Krishnakumar | G06F 9/4881 718/103 |
| 2011/0246688 A1 | 10/2011 | Vaz et al. | |
| 2014/0068621 A1* | 3/2014 | Sitaraman | G06F 9/505 718/102 |
| 2014/0129806 A1* | 5/2014 | Kaplan | G06F 9/3824 712/220 |
| 2016/0226772 A1* | 8/2016 | Srinivasan | H04L 47/12 |

* cited by examiner

|        | Data Rate | Threshold | Example A | Example B |
|--------|-----------|-----------|-----------|-----------|
| Local  | N         | -         | 0/17 (1)  | 5/15 (1)  |
| Global | N/2       | 1/2       | 8/17 (1)  | 9/15 (0)  |
| Vertex | N/4       | 1/4       | 9/17 (0)  | 1/15 (1)  |

Format: cycles / total cycles (hint bit)

HINTS FOR SHARED STORE PIPELINE AND MULTI-RATE TARGETS

BACKGROUND

Technical Field

This disclosure relates generally to graphics processors and more specifically to techniques for selecting store instructions for dispatch to a shared store pipeline.

Description of the Related Art

Graphics processing often involves executing the same instruction in parallel for different graphics elements (e.g., pixels or vertices). Further, the same group of graphics instructions is often executed multiple times (e.g., to perform a particular function for different graphics elements or for the same graphics elements at different times). Graphics processors (GPUs) are often included in mobile devices such as cellular phones, wearable devices, etc., where power consumption and processor area are important design concerns.

Many GPUs include multiple different types of memory. For example, as discussed in U.S. patent application Ser. No. 15/389,047, a graphics processor may have various separate memory spaces. Further, different types of memory may be used for fragment data, texture/image data, and vertex data, for example. Various target memories for store instructions may be configured to accept data at different rates. This may be based on their bus capabilities, circuit technology, configuration (e.g., number of banks), etc.

SUMMARY

Techniques are disclosed relating to selecting store instructions for dispatch to a shared pipeline. In some embodiments, the shared pipeline processes instructions for different target clients with different data rate capabilities. Thus if more than a threshold amount of work in the pipeline targets a slower target, this could reduce pipeline throughput for faster targets. Therefore, in some embodiments, the pipeline is configured to generate state information that is based on a determined amount of work in the pipeline that targets at least one slower target. In some embodiments, the state information indicates whether the amount of work is above a threshold for the particular target. In some embodiments, scheduling circuitry is configured to select instructions for dispatch to the pipeline based on the state information. For example, the scheduling circuitry may refrain from selecting instructions with a slower target when the slower target is above its threshold amount of work in the pipeline.

In some embodiments, the shared pipeline is a store pipeline configured to execute store instructions that target memories with different data rate capabilities. In some embodiments, the amount of work in the store pipeline for a given target is determined as a number of memory bus cycles needed to write the store data in the pipeline to that target. In some embodiments, the amount of work is determined as a ratio between work for a particular target and a total amount of work in the store pipeline. In some embodiments, the amount of work is predicted, e.g., because it may not be known how many cycles are needed for a given store instruction until its target address(es) are determined. Therefore, in some embodiments, the store pipeline is configured to predict the amount of work to be performed for a store instruction with a particular target based on amounts of work performed for prior store instructions with the particular target.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. "Scheduling circuitry configured to schedule instructions," for example, is intended to cover a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element.

Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 1A:
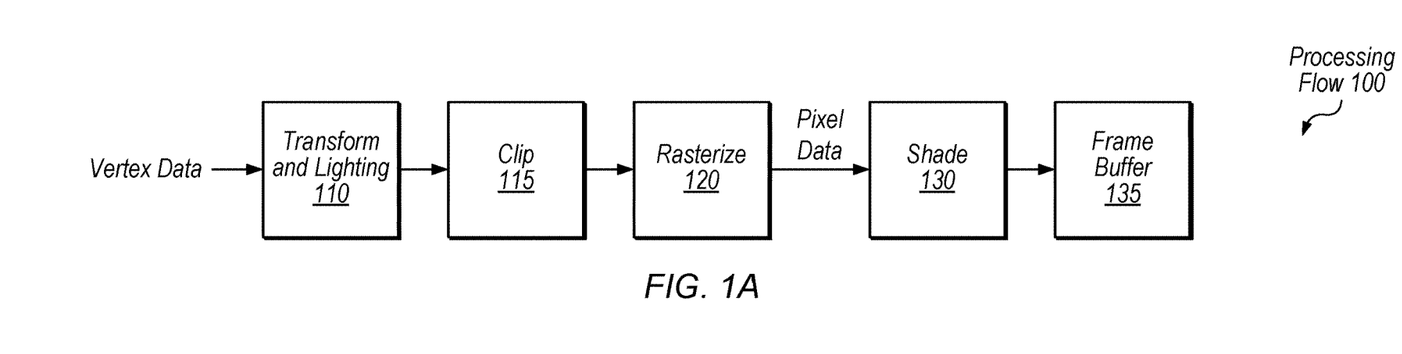
FIG. 1A is a block diagram illustrating an exemplary graphics processing flow.
Figure 1B:
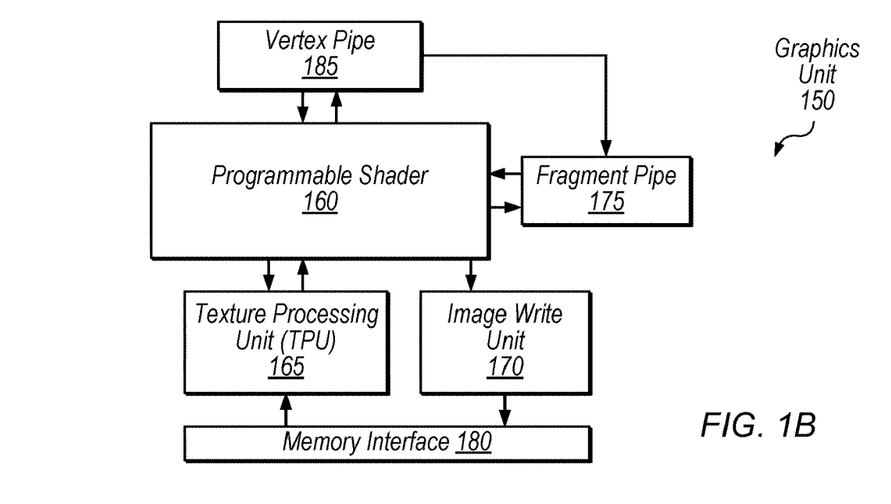
FIG. 1B is a block diagram illustrating an exemplary graphics unit, according to some embodiments.
Figure 2:
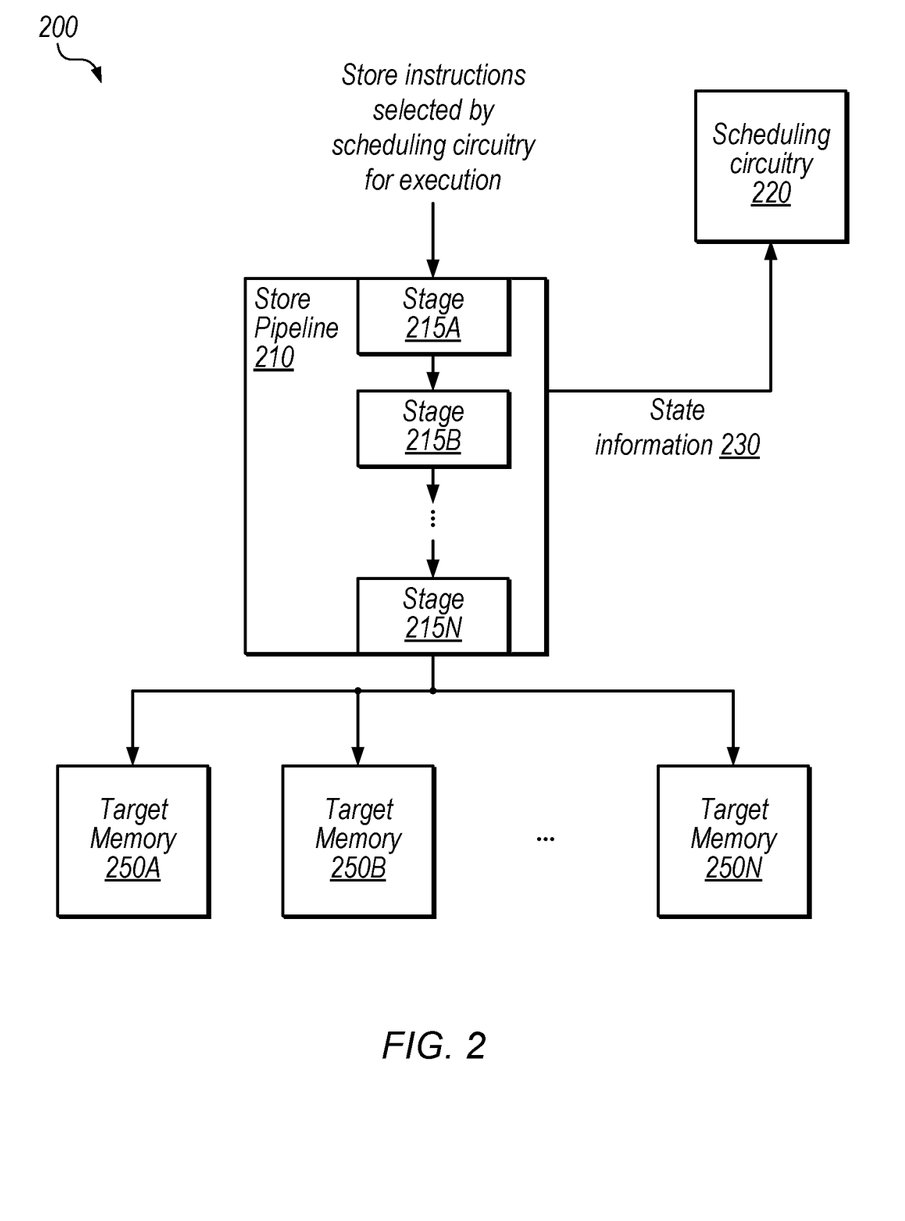
FIG. 2 is a block diagram illustrating an exemplary store pipeline configured to generate pipeline state information, according to some embodiments.
Figure 3:
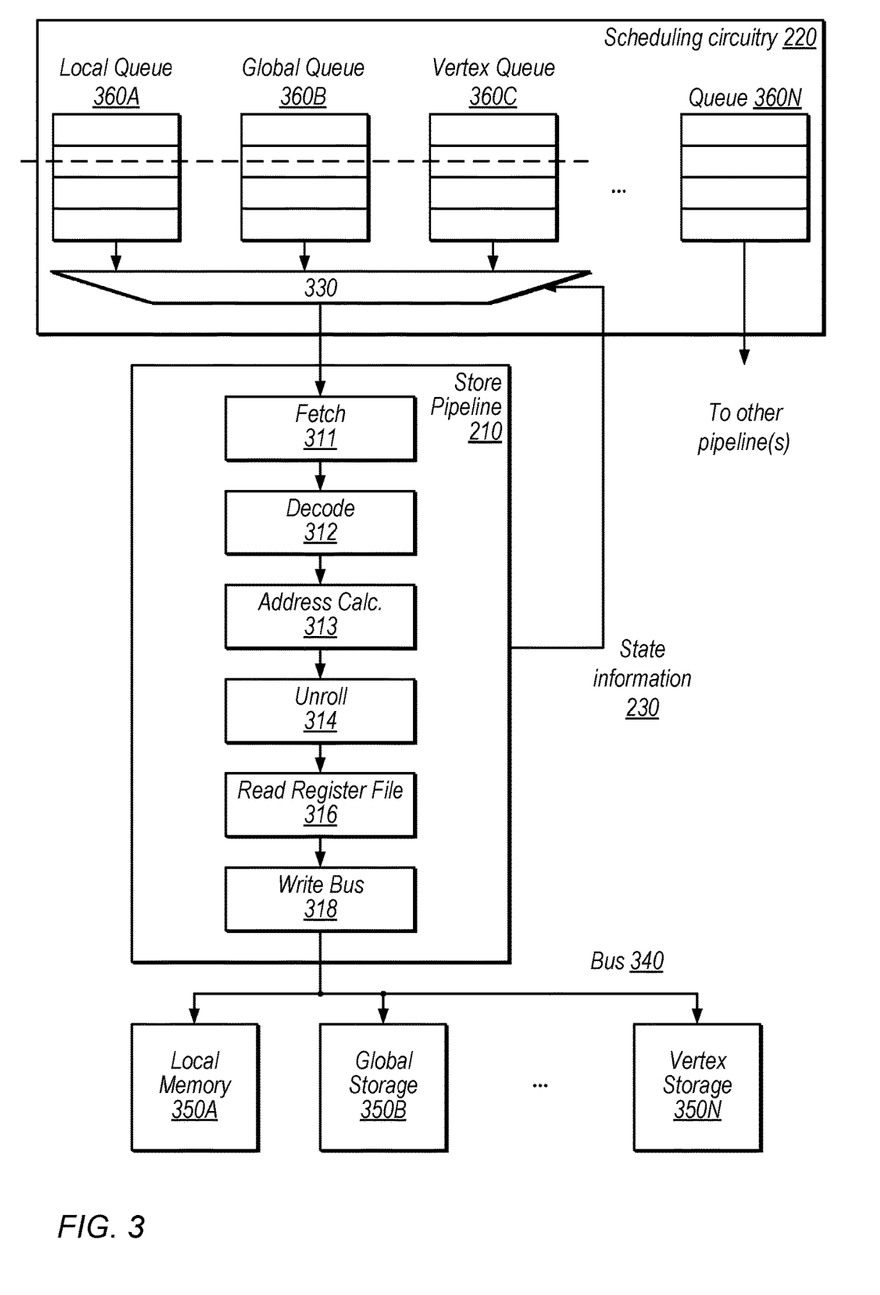
FIG. 3 is a block diagram illustrating a more detailed store pipeline and scheduling circuitry, according to some embodiments.
Figure 6:
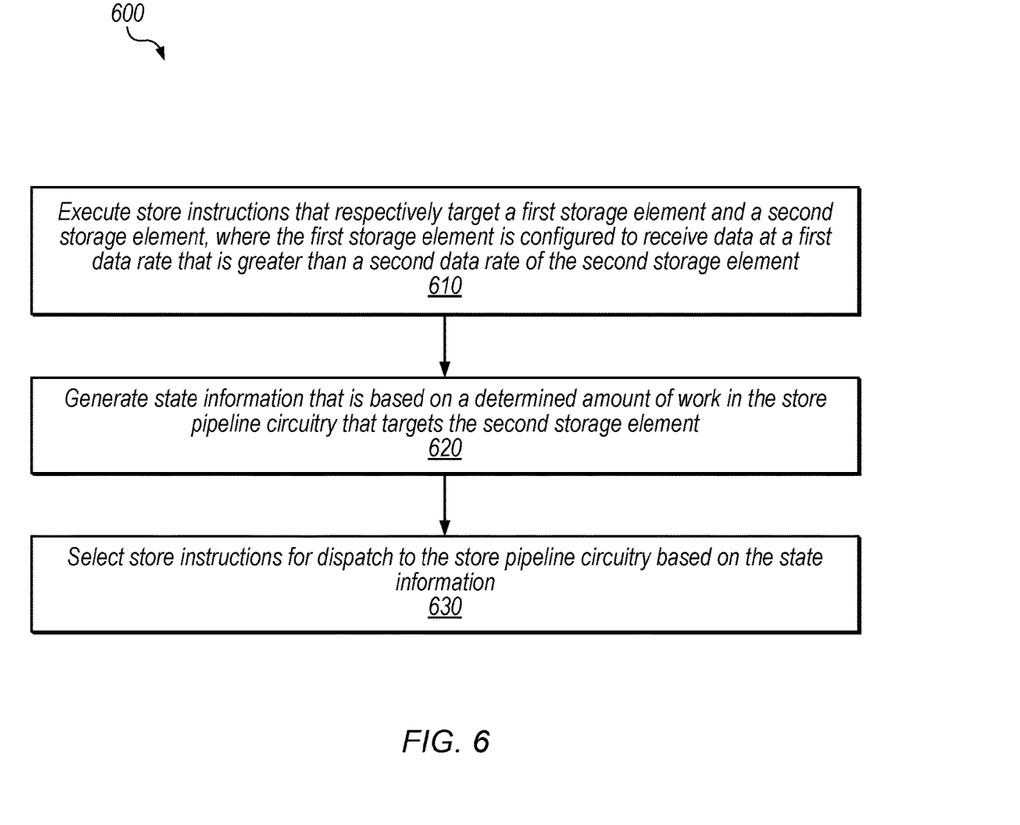
FIG. 6 is a flow diagram illustrating a method for selecting store instructions to send to store pipeline circuitry, according to some embodiments.
Figure 7:
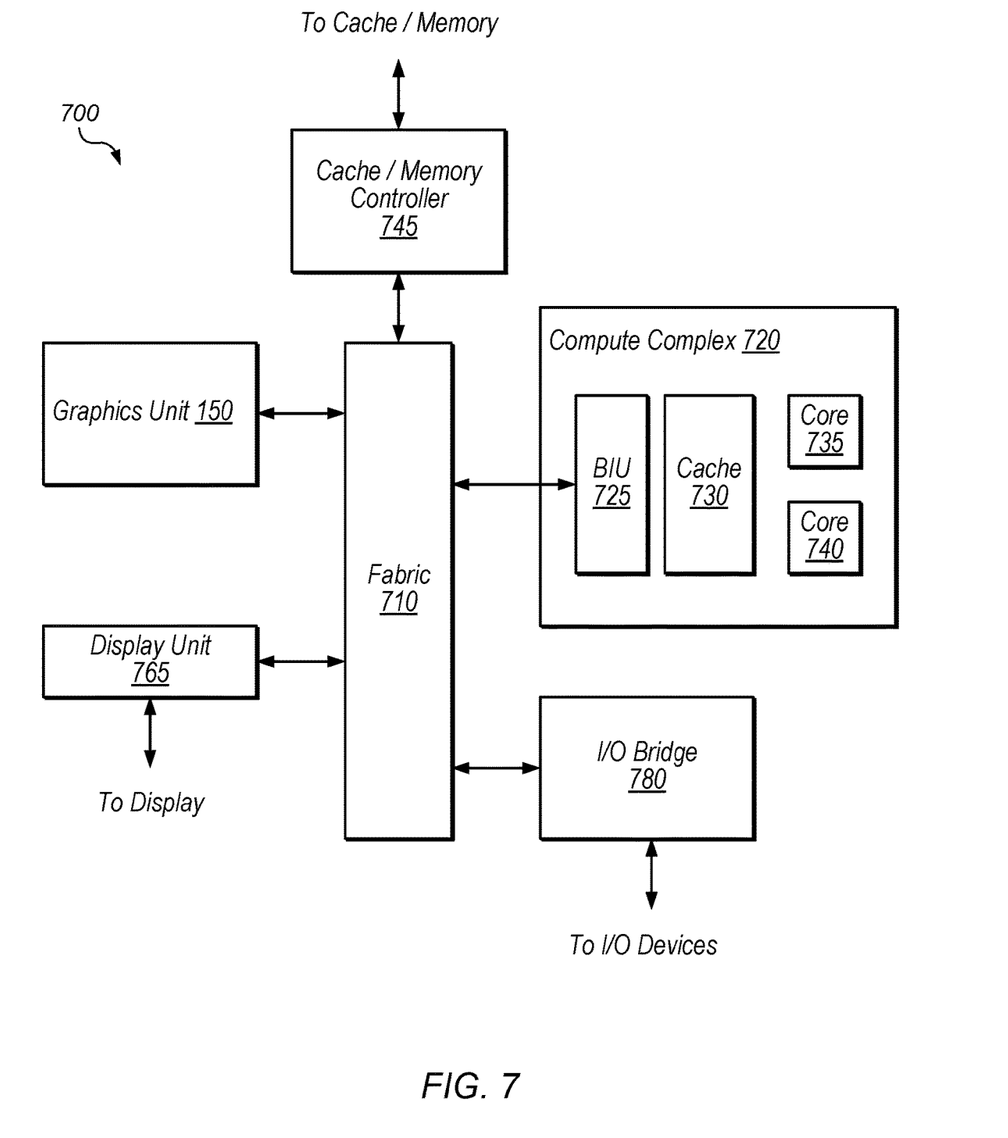
FIG. 7 is a block diagram illustrating an exemplary device, according to some embodiments.
Figure 8:
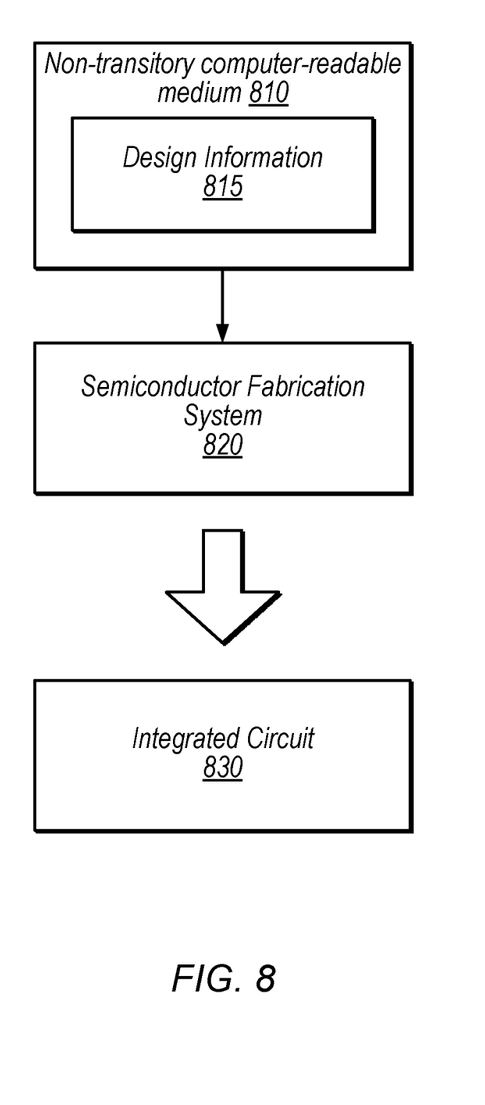
FIG. 8 is a block diagram illustrating an exemplary computer-readable medium, according to some embodiments.

This disclosure initially describes, with reference to FIGS. 1A-1B, an overview of a graphics processing flow and an exemplary graphics unit. FIGS. 2-3 illustrate exemplary store pipeline circuitry and scheduling circuitry. Exemplary data rates, thresholds, and store pipeline situations are discussed with reference to FIG. 4. Exemplary cycle prediction techniques are discussed with reference to FIG. 5. FIG. 6 illustrates an exemplary method; FIG. 7 illustrates an exemplary device; and FIG. 8 illustrates an exemplary computer-readable medium. In various embodiments, the disclosed techniques may reduce power consumption, improve performance, and/or reduce area relative to traditional store pipeline techniques.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary Store Pipeline Overview

FIG. 2 is a block diagram illustrating exemplary circuitry 200 that includes store pipeline 210, scheduling circuitry 220, and multiple target memories 250A-250N. In some embodiments, at least a portion of circuitry 200 is included in programmable shader 160.

Using a shared store pipeline for multiple target elements as shown in FIG. 2 may result in a slow target storage element flooding the store pipeline 210. Using separate store pipelines for different target storage elements, however, may result in replicated circuitry, which may increase area and power consumption. Therefore, in some embodiments, store pipeline 210 is shared by multiple targets but is configured to generate state information that is used by scheduling circuitry 220 to avoid flooding store pipeline 210 with instructions that target slower targets.

Store pipeline 210, in the illustrated embodiment, includes multiple stages 215A-215N. In some embodiments, each stage includes sequential logic such as latches and is configured, in a given clock cycle, to receive data from a previous stage, process the received data, and generate data for a subsequent stage. In the illustrated embodiment, pipeline stages 215 are shared between multiple target memory elements 250. Therefore, in some embodiments, store pipeline 210 is configured to perform store instructions for multiple different target memories, which may include different types of memories.

The concept of a processor "pipeline" is well understood, and refers to the concept of splitting the "work" a processor performs on instructions into multiple stages. In one embodiment, instruction decode, dispatch, execution, and retirement may be examples of different pipeline stages. Many different pipeline architectures are possible with varying orderings of elements/portions. Various pipeline stages perform such steps on an instruction during one or more processor clock cycles, then pass the instruction and/or operations associated with the instruction on to other stages for further processing. In some embodiments, a store pipeline is a portion of a larger processor pipeline (e.g., instructions may be initially decoded to determine that they are store instructions and then fully decoded once they are dispatched to store pipeline circuitry).

In the illustrated embodiment, target memories 250 share a bus, but in other embodiments, target memories that are served by the same store pipeline may use separate buses to receive data from the store pipeline.

Ones of target memories 250, in some embodiments, have different data rate capabilities for receiving data from store pipeline 210. For example, if the fastest target memory 250 is configured to receive N bytes of data per bus cycle, other target memories 250 may be configured to receiver N/2, N/4, etc. bytes of data per bus cycle. Bus cycles are used herein for purposes of illustration; but data rates may generally have various units of data over various amounts of time, such as bytes per clock cycle, bits per second, etc. Further, two memories with different bus clock speeds may receive the same amount of data per cycle but still have different data rates.

Note that target memories 250 may be implemented, without limitation, using: random access memory, cache memory, volatile or non-volatile memory, on or off-chip memory, etc. Exemplary types of memory are discussed herein for purposes of illustration but are not intended to limit the scope of disclosed embodiments. Target memories 250 may be different sizes, may be used to store different types of data, and/or may differ in other respects. The different data rates of different memories may arise from different numbers of banks, different numbers of replicated storage elements used for a different type of memory, different bus speeds, different memory technologies used for actual storage, etc.

In the event that a significant number of instructions in store pipeline 210 target a target memory 250 with a slower data rate, the overall performance of the pipeline may decrease. For example, if many instructions target a memory 250 with a data rate of N/4, another target memory 250 with a potential data rate of N may be effectively restricted to operating at N/4 while waiting for the operations that target the slower memory.

Therefore, in some embodiments, store pipeline 210 is configured to provide state information 230 to scheduling circuitry 220. Scheduling circuitry 220, in some embodiments, is configured to select instructions for dispatch to store pipeline 210. In some embodiments, the scheduling circuitry is configured to use the state information 230 to avoid selecting store instructions that a target slower memory when there is a threshold amount work for such instructions already in store pipeline 210. Thus, state information 230 may be referred to as a "hint" to scheduling circuitry 220 regarding the types of store instructions that should be issued based on the work currently in the store pipeline 210. This may avoid situations where store instructions to slower memory stall store instructions to faster memory, in some embodiments.

The amount of work may be determined using different units in different embodiments and the state information may directly specify the amount of work or may be determined based on the amount of work. In some embodiments, the amount of work is determined as a ratio or percentage, e.g., an amount of work in store pipeline 210 that targets a particular type of storage divided by a total amount of work in store pipeline 210. In other embodiments, the amount of work is determined as an amount of work that targets a particular type of storage, without consideration of the total amount of work in store pipeline 210. In some embodiments, the amount of work has units of store instructions or store operations. In some embodiments, the amount of work has units of memory bus cycles to be performed for store instructions in store pipeline 210. In some embodiments, the amount of work is predicted without actual knowledge of the amount of work to be performed (e.g., based on a predicted number of memory bus cycles for store instructions, before the store instructions have been unrolled to determine the actual number of cycles needed).

Exemplary Detailed Store Pipeline

FIG. 3 is a block diagram illustrating a more detailed view of store pipeline 210 and scheduling circuitry 220, according to some embodiments. The specific pipeline stages, types of target memories, and scheduling circuitry shown in FIG. 3 are included for purposes of explanation and are not intended to limit the scope of the present disclosure.

In the illustrated embodiment, store pipeline 210 is configured to process store instructions for a local memory 350A, a global storage 350B, and a vertex storage 350N. These elements are non-limiting examples of different types of target memories 250. In some embodiments, the local memory 350A is physically proximate to shader cores in programmable shader 160 and is primarily used to store pixel data. In some embodiments, global storage 350B is a cache (e.g., a level 1 data cache) in a global memory hierarchy for graphics unit 150. In some embodiments, vertex storage 350N is configured to store results of vertex processing performed by programmable shader 160 for further processing by vertex pipe 185 (and/or vice versa).

In some embodiments, local memory 350 is configured to accept four quads of data per cycle (full-rate in this example), global storage 350B is configured to accept two quads of data per cycle (half-rate in this example), and vertex storage 350N is configured to accept one quad of data per cycle (quarter-rate in this example). Note that quads are discussed herein for exemplary purposes, given that a 2×2 group of pixels is a common granularity of data for graphics processing, e.g., using singe-instruction multiple-data (SIMD) techniques.

In the illustrated embodiment, store pipeline 210 includes the following stages: fetch 311, decode 312, address calculation 313, unroll 314, read register file 316, and write bus 318. Fetch 311, in some embodiments, is configured to retrieve instruction information. For example, in some embodiments, scheduling circuitry 220 is configured to queue information that indicates locations of instructions but not actual instructions themselves. In these embodiments, fetch stage 311 may be configured to retrieve the actual instruction information.

Decode 312, in some embodiments, is configured to determine the nature of fetched instructions (e.g., what type of store instruction, what type of memory is targeted, etc.). In some embodiments, the determination of the target memory may be used to track the amount of work in the store pipeline 210 for the corresponding target. Address calculation 313, in some embodiments, is configured to determine addresses for store instructions, e.g., by retrieving an immediate operand, adding a base to an offset, or performing calculations for indirect addressing.

A given store instruction may target multiple locations which may or may not be adjacent. Therefore, unroll stage 314, in some embodiments, is configured to unroll certain store instructions into multiple operations that access bus 340 in different cycles. Although unroll stage 314 is shown as a separate stage, it may be included in address calculation stage 313, in some embodiments.

Because the actual number of bus cycles needed for store instructions is not known until after unrolling, in some embodiments, store pipeline 210 may be configured to predict the number of cycles needed for each store instruction and state information 230 may reflect this prediction, as discussed in further detail below with reference to FIG. 5.

Read register file stage 316, in the illustrated embodiment, is configured to access a register file, using an address generated by stage 313, to retrieve the data to be stored in the target memory.

Write bus stage 318, in the illustrated embodiment, is configured to transmit store data to a target storage element 350 via bus 340. The disclosed pipeline stages are included for exemplary purposes but are not intended to limit the scope of the present disclosure. In various embodiments, stages may be omitted, other stages may be implemented in addition to or in place of the disclosed stages, and the ordering of the stages may be altered.

In some embodiments, state information 230 specifies, for each target memory type that is not full rate, whether instructions for that type are desired from scheduling circuitry 220. This may be specified as a single bit. In the illustrated embodiment, state information 230 may include a bit for global storage 350B and a bit for vertex storage 350N. In some embodiments, store pipeline 210 is configured to indicate that instructions for one or both these targets are desired if a threshold amount of work is not present in store pipeline 210 for these targets. The amount of work may be determined in a number of ways. For example, the amount of work may be determined as a number of bus cycles needed to write the data to the target memory. The amount of work may also be determined as a number of store instructions in store pipeline 210. The amount of work may be at least partially a prediction, which may be sufficiently accurate for the purposes of generating state information 230.

Figure 4:
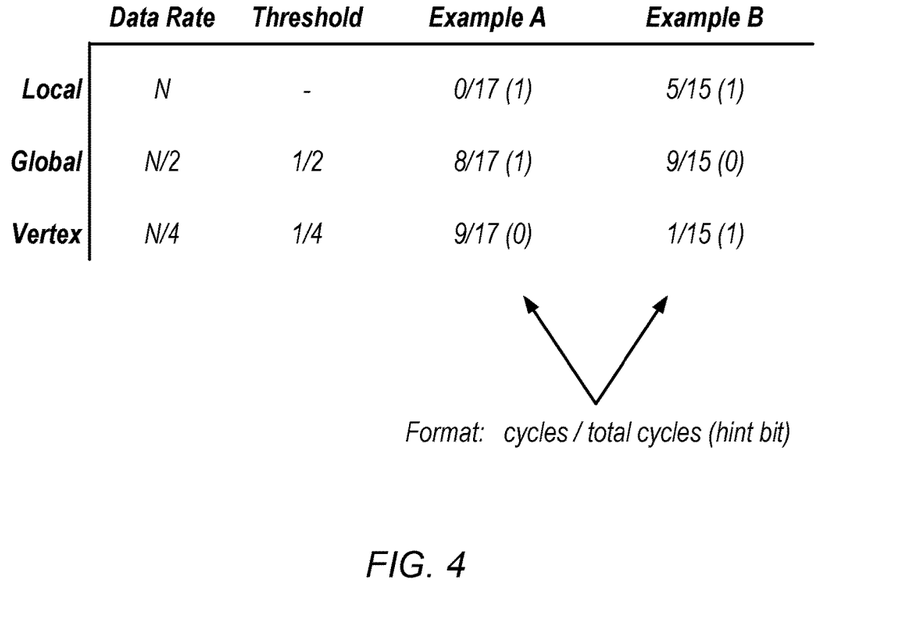
FIG. 4 is a block diagram illustrating exemplary data rates, thresholds, and example store queue situations for different target memory types, according to some embodiments.

For example, referring to FIG. 4, the threshold for global storage 350B may be ½ of the data in the store pipeline 210 and the threshold for vertex storage 350N may be ¼ of the data in the store pipeline 210. In example A of FIG. 4, there are 17 total cycles of work in the store pipeline 210 for all three targets. In example A, there are no cycles of work targeting local memory 350A, eight cycles that target global memory 350B, and nine cycles that target vertex memory 350N. In some embodiments, state information 230 includes a hint bit for each target memory type. In some embodiments, a hint bit for local memory 350A is not implemented or is always one (indicating that instructions are desired, in this example, while a zero value indicates that instructions are not desired for that type of target), because local memory 350A is full-rate. In the illustrated example A, the hint bit for global storage 350B is one, indicating that instructions that target this memory are still acceptable, because its threshold has not been met (8/17 is less than ½). In the illustrated example A, the hint bit for vertex storage 350N is zero because its threshold has been met (9/17 is greater than ¼), indicating that store instructions that target vertex storage 350N should not be dispatched unless there are no other types of instructions. In Example B, there are 15 total data cycles, global storage 350B's threshold is met and its hint bit indicates that store instructions that target global storage 350B should not be dispatched unless there are no instructions targeting local memory 350A. In example B, vertex storage 350N's threshold is not met, so its hint bit indicates that instructions that target this storage are still acceptable.

In some embodiments, the threshold may be based on the relationship between data rates of one or more slower memories and a fastest memory that a store pipeline is configured to service. For example, in some embodiments if the fastest memory is N times as fast as another memory serviced by store pipeline 210, then the threshold for that other memory maybe by 1/N of the amount of work in store pipeline 210. In some embodiments, the threshold may be dynamically determined based on changing data rate capabilities (e.g., in different modes of operation) and/or other parameters.

Turning back to FIG. 3, in some embodiments the state information 230 is used to control MUX 330 to select store instructions from one of queues 360A-360C to be sent to store pipeline 210. In the illustrated embodiment, scheduling circuitry 220 is configured to store data for instructions in a number of queues. Queues 360A-360C are for store instructions, in the illustrated embodiment, while queue 360N may be for some other type of instruction, such that its outputs are sent to one or more other pipelines.

Local queue 360A is configured to store data for store instructions that target local memory 350A, global queue 360B is configured to store data for instructions that target global storage 350B, and vertex queue 360C is configured to store data for store instructions that target vertex storage 350N, in the illustrated embodiment. The data stored in queues 360 may be actual instruction data or may indicate the location of the actual instruction data (e.g., which may then be accessed by fetch stage 311). In the illustrated embodiment, the dashed line indicates a threshold queue level. In some embodiments, scheduling circuitry is configured to allocate additional entries in a queue for more instructions when its active entries fall below this threshold queue level (the threshold may vary among the different queues). Therefore, as MUX 330 selects instructions for store pipeline 210, scheduling circuitry 220 is configured to maintain a threshold amount of store instructions in each queue 360, assuming store instructions of each type are available.

In some embodiments, when instructions that target faster memories are not available (e.g., local queue 360A is empty), scheduling circuitry 220 may be configured to issue instruction that target slower memories (e.g., from queue 360B and/or 360C) even when state information 230 indicates that the slower memories have more than their respective threshold amounts of work in store pipeline 210.

Consider the following exemplary scenarios, where a single hint bit is used for each target. First assume store instructions are available in all three queues 360A-360C. In this scenario, if the hint bits for global storage 350B and vertex storage 350C both indicate that the work for these targets is above its respective threshold, then scheduling circuitry 220 is configured to issue store instructions from only local queue 360A until the state information 230 changes. As another example, if the hint bit for global storage 350B indicates that it is not above its threshold but the hint bit for vertex storage 350C indicates that it is above its threshold, then scheduling circuitry 220 is configured to issue store instructions from queues 360A and 360B. In scenarios where multiple hint bits indicate targets are below their thresholds, scheduling circuitry 220 may be configured to use a round-robin technique among queues, or some other technique. As discussed above, in some situations scheduling circuitry may dispatch store instructions to store pipeline 210 that target a given memory even when that memory's hint bit indicates that the memory is above its threshold amount of work in the store pipeline 210. For example, if vertex storage 350N is above its threshold but queues 360A and 360B are empty, scheduling circuitry 220 may continue to dispatch instructions that target vertex storage 350N.

As shown, many of the stages 311-318 of store pipeline 210 may be similar or identical for processing instructions that target the different types of target memories. Therefore, in various embodiments, a shared store pipeline with state information may avoid replication of circuitry without performance being substantially reduced by slower target memories. Further, the disclosed techniques may reduce or avoid situations whether slower target memories restrict the overall store pipeline throughput.

Prediction Techniques

Figure 5:
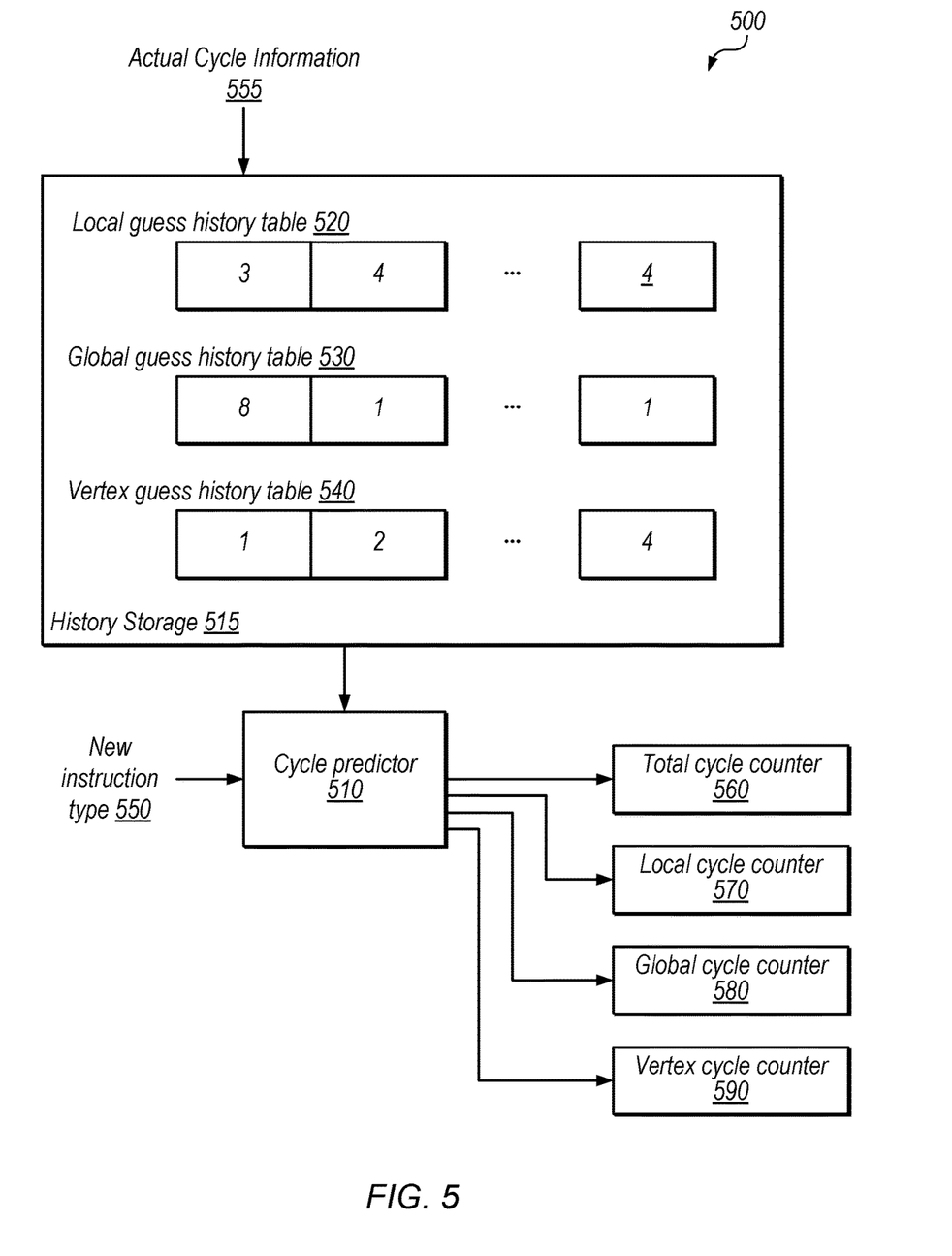
FIG. 5 is a block diagram illustrating an exemplary cycle predictor and guess history table, according to some embodiments.

FIG. 5 is a block diagram illustrating exemplary circuitry 500 configured to predict the amount of work in the store pipeline 210 that targets different storage elements, according to some embodiments. In some embodiments, circuitry 500 is included in store pipeline 210. In the illustrated embodiment, circuitry 500 includes cycle predictor 510, history storage 515, a total cycle counter 560, and a cycle counter for each target memory type (elements 570, 580, and 590 in the illustrated embodiment).

In the illustrated embodiment, store pipeline 210 is configured to determine a new instruction type 550 for received instructions (e.g., using decode stage 312). Cycle predictor 510, in the illustrated embodiment, is configured to predict a number of memory bus cycles to be used for the instruction based on the type 550. For example, the type 550 may indicate the target memory and cycle predictor 510 may predict the number of memory bus cycles based on past instructions that targeted the target memory. In other embodiments, the instruction type 550 may include other information, e.g., based on the determined nature of the store instruction, in order to more accurately predict how store instructions will be unrolled.

The amount of work needed for different store instructions of a given type may vary considerably. Consider a store instruction that stores data for four threads in an exemplary scenario with a 16-byte memory bus width. If the four threads target four adjacent locations for 32-bit stores, then the store instruction may be performed in a single memory cycle. If the four threads each have a strided 16-bit load, on the other hand, eight memory cycles may be needed to perform the store instruction. In this example design, these may be the limit cases (one and eight cycles), while other number of cycles in between these values may be needed for other store instructions. Further, the maximum number of memory bus cycles per store instruction may vary across designs, e.g., based on the memory bus width, the SIMD size, the smallest addressable data size, etc. Therefore, until address calculation and unrolling are performed, store pipeline 210 may not be able to determine the actual number of memory bus cycles to be used for store instructions.

Cycle predictor 510, however, is configured to predict the number of memory bus cycles based on past history, in some embodiments. For example, in the illustrated embodiment, history storage 515 includes a local guess history table for store instructions that targeted local memory 350A, a global guess history table 530 for store instructions that targeted global memory 350B, and a vertex guess history table 540 for store instructions that targeted vertex storage 350N. In the illustrated embodiment, each history table includes a number of entries configured to store the actual number of cycles used for past instructions that targeted the corresponding memory. In the illustrated embodiment, store pipeline 210 is configured to add the number of cycles to the tail of the appropriate table, based on actual cycle information 555 (e.g., as determined by unroll stage 314). Cycle predictor 510 may then use these history tables to predict the amount of work for store instructions in earlier pipeline stages (e.g., stages 311, 312, and 313). For example, for a store instruction that targets local memory 350A, cycle predictor 510 may average the elements in local guess history table 520. In other embodiments, cycle predictor 510 may perform any of various operations on the entries in history storage 515 to determine a predicted amount of work for an incoming instruction.

In the illustrated embodiment, the guess history tables 520, 530, and 540 store actual numbers of cycles. In other embodiments, these entries may be encoded differently. For example, in some embodiments the entries specify how many cycles away the previous predictions were from the actual cycles used. In these embodiments, cycle predictor 510 may maintain a predicted number of cycles per instructions for each target type, which it may increase or decrease based on the entries in the corresponding guess history table.

In the illustrated embodiment, cycle predictor is configured to increment respective counters 560, 570, 580, and 590 based on the predicted number of cycles. For example, if four cycles is predicted based on new instruction type 550 for an instruction that targets local memory 350A, circuitry 500 may increase the values of total cycle counter 560 and local cycle counter 570 by four.

In some embodiments, the amount of work, for a given target storage type, is determined as the target storage type's counter value divided by the total cycle counter value. For example, if total cycle counter 560 has a value of 15 and the global cycle counter 580 has a value of 7, the amount of work is $7/15$. The corresponding state information (e.g., a hint bit for global store 350B), may then be specified based on whether the amount of work is greater than a threshold amount of work for global store 350B. Similar techniques may be used for any of various target memory types.

The disclosed prediction techniques, state information encoding, techniques for determining amounts of work for different targets, etc. are disclosed for purposes of illustration and are not intended to limit the scope of the present disclosure. In other embodiments, prediction may not be used, different prediction techniques may be used, different encodings may be used, processing tasks may be split differently (e.g., circuitry described as residing in store pipeline 210 may be included in scheduling circuitry 220 and/or vice versa), different numbers or types of target memories may be implemented, different units of work may be tracked and predicted, etc.

Various embodiments disclosed herein relate to shared store pipeline circuitry. In other embodiments, similar techniques may be used for any of various other types of pipelines (e.g., load pipelines, arithmetic pipelines, texture processing pipelines, etc.). In these embodiments, a shared pipeline may execute instructions for different target clients with different data rate capabilities and generate state information that indicates the amount of work in the pipeline for one or more slower targets. Various processing elements may be implemented as targets of the shared store pipeline; memory clients are discussed herein for purposes of illustration but are not intended to limit the scope of the present disclosure.

Exemplary Method

FIG. 6 is a flow diagram illustrating a method 610 for selecting instructions for dispatch to store circuitry based on hint information, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, store pipeline 210 executes store instructions that respectively target a first storage element and a second storage element, where the first storage element is configured to receive data at a first data rate that is greater than a second data rate of the second storage element. For example, store pipeline 210 may execute store instructions that target both local memory 350A and global storage 350B, where local memory 350A is configured to receive data at N times the rate of global storage 350B, in some embodiments. In this situation, if a threshold amount of work in store pipeline 210 targets global storage 350B (more than 1/N, in this example), performance of store instructions that target local memory 350A will begin to degrade.

At 620, in the illustrated embodiment, store pipeline 210 generates state information that is based on a determined amount of work in the store pipeline circuitry that targets the second storage element. In some embodiments, the state information explicitly specifies the amount of work. In other embodiments, the state information specifies information that is based on the amount of work (e.g., as a hint bit that indicates whether the amount of work is over a threshold).

At 630, in the illustrated embodiment, scheduling circuitry 220 selects store instructions for dispatch to the store pipeline circuitry based on the state information. For example, scheduling circuitry 220 may refrain from dispatching instruction that target the second storage element when the state information indicates that the amount of work in store pipeline 220 that targets the second storage element is above a threshold. As discussed above, the amount of work may be predicted, in at least some of the stages of store pipeline 210. The amount of work may be determined using any of various appropriate metrics including, without limitation: number of instructions, number of memory bus cycles, predicted number of memory bus cycles, amount of data to be stored, number of different target locations, type of instructions, etc.

Exemplary Device

Referring now to FIG. 7, a block diagram illustrating an exemplary embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 780, and display unit 765. In some embodiments, device 700 may include other components (not shown) in addition to and/or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 150 may be described as "coupled to" a memory through fabric 710 and cache/memory controller 745. In contrast, in the illustrated embodiment of FIG. 7, graphics unit 150 is "directly coupled" to fabric 710 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 8 is a block diagram illustrating an exemplary non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable medium 810, may comprise any of various appropriate types of memory devices or storage devices. Medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 810 may include other types of non-transitory memory as well or combinations thereof. Medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabrication at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1-3, and/or 5. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

\* \* \*

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   scheduling circuitry;
   first and second target storage elements, wherein the first target storage element is configured to receive data at a first data rate that is greater than a second data rate at which the second target storage element is configured to receive data; and
   store pipeline circuitry configured to:
      use the same hardware store pipeline to process store instructions to provide data to the first target storage element and store instructions to provide data to the second target storage element as specified by the processed store instructions; and
      generate state information that is based on a determined amount of work to be performed for store instructions in the hardware store pipeline that target the second target storage element;
   wherein the scheduling circuitry is configured to select store instructions for dispatch to the store pipeline circuitry based on the state information.

2. The apparatus of claim 1, wherein the store pipeline circuitry is configured to determine the amount of work as a number of memory bus cycles to be used to perform store instructions in the hardware store pipeline that target the second target storage element.

3. The apparatus of claim 2, wherein the store pipeline circuitry is configured to predict the number of memory bus cycles based on numbers of memory bus cycles used for one or more prior instructions that targeted the second target storage element.

4. The apparatus of claim 2, wherein the determined amount of work is a number of memory bus cycles to be used for instructions in the hardware store pipeline that target the second target storage element divided by memory bus cycles to be used for instructions in the hardware store pipeline.

5. The apparatus of claim 1, wherein the state information includes a bit that indicates, based on the determined amount of work, whether store instructions that target the second target storage element should be dispatched.

6. The apparatus of claim 1, wherein the state information indicates whether the determined amount of work exceeds a threshold.

7. The apparatus of claim 6, wherein the threshold is based on a ratio between the second data rate and the first data rate.

8. The apparatus of claim 1, wherein the first target storage element is a local memory and the second target storage element is a cache in a global memory hierarchy.

9. The apparatus of claim 1, wherein the scheduling circuitry includes first and second queues for store instructions that target the respective first and second target storage elements and wherein the scheduling circuitry is configured to select a queue to provide one or more store instructions for dispatch in a given cycle based on the state information.

10. A method, comprising:
    executing, by the same hardware store pipeline of store pipeline circuitry, store instructions that respectively target a first storage element and a second storage element, wherein the first storage element is configured to receive data at a first data rate that is greater than a second data rate at which the second storage elements is configured to receive data;
    generating, by the store pipeline circuitry, state information that is based on a determined amount of work to be performed for store instructions in the hardware store pipeline that target the second storage element;
    selecting, by scheduling circuitry, store instructions for dispatch to the store pipeline circuitry based on the state information.

11. The method of claim 10, wherein the amount of work is determined as a number of memory bus cycles for store instructions in the hardware store pipeline that target the second storage element.

12. The method of claim 10, further comprising predicting the amount of work based on prior work involved in execution of completed store instructions that targeted the second storage element.

13. The method of claim 12, further comprising:
    determining, by the store pipeline, respective numbers of bus cycles needed to perform ones of the store instructions.

14. The method of claim 10, wherein the amount of work is a percentage of total work in the hardware store pipeline.

15. The method of claim 10, wherein the state information includes a bit that indicates whether store instructions that target the second storage element should be dispatched.

16. A non-transitory computer readable storage medium having stored thereon design information that specifies a design of at least a portion of a hardware integrated circuit in a format recognized by a semiconductor fabrication system that is configured to use the design information to produce the circuit according to the design, including:
    scheduling circuitry;
    first and second storage elements, wherein the first storage element is configured to receive data at a first data rate that is greater than a second data rate of the second storage element; and
    store pipeline circuitry configured to:
       use the same hardware store pipeline to process store instructions to provide data to the first storage element and store instructions to provide data to the second storage element; and
       generate state information that is based on a determined amount of work to be performed for store instructions in the hardware store pipeline that target the second storage element;
    wherein the design information specifies that the scheduling circuitry is configured to select store instructions for dispatch to the store pipeline circuitry based on the state information.

17. The non-transitory computer readable storage medium of claim 16, wherein the design information further specifies that the store pipeline circuitry is configured to determine the amount of work as a number of memory bus cycles to be used to perform store instructions in the hardware store pipeline that target the second storage element.

18. The non-transitory computer readable storage medium of claim 17,
the store pipeline circuitry is configured to predict the number of memory bus cycles based on numbers of memory bus cycles used for one or more completed instructions that targeted the second storage element.

19. The non-transitory computer readable storage medium of claim 17, wherein the number of memory bus cycles is a predicted number.

20. The non-transitory computer readable storage medium of claim 16, wherein the first storage element is configured to store pixel data and the second storage element is configured to store vertex data.

* * * * *